United States Patent
Goldman et al.

(10) Patent No.: US 8,612,065 B2
(45) Date of Patent: Dec. 17, 2013

(54) POSITION ENCODER WITH PROGRAMMABLE TRIGGER OUTPUT SIGNAL

(75) Inventors: Andrew M. Goldman, Stow, MA (US); Paul A. Remillard, Littleton, MA (US)

(73) Assignee: GSI Group Corporation, Bedford, MA (US)

( * ) Notice: Subject to any disclaimer, the term of this patent is extended or adjusted under 35 U.S.C. 154(b) by 789 days.

(21) Appl. No.: 12/717,987

(22) Filed: Mar. 5, 2010

(65) Prior Publication Data
US 2011/0218695 A1 Sep. 8, 2011

(51) Int. Cl.
*G05D 3/12* (2006.01)
(52) U.S. Cl.
USPC .............................................. 700/302; 700/56
(58) Field of Classification Search
USPC .......... 700/56, 60, 61, 302; 324/754.1, 754.2, 324/762.01; 382/133, 145
See application file for complete search history.

(56) References Cited

U.S. PATENT DOCUMENTS

| | | | | | |
|---|---|---|---|---|---|
| 4,200,925 | A | * | 4/1980 | Cushman | 700/9 |
| 4,371,921 | A | * | 2/1983 | Cushman | 700/9 |
| 4,628,298 | A | * | 12/1986 | Hafle et al. | 341/1 |
| 5,068,645 | A | * | 11/1991 | Drumm | 345/184 |
| 6,239,939 | B1 | * | 5/2001 | Bui et al. | 360/77.12 |
| 6,326,908 | B1 | * | 12/2001 | Hoffman et al. | 341/111 |
| 6,514,722 | B2 | * | 2/2003 | Palsson et al. | 435/40.5 |
| 6,534,308 | B1 | * | 3/2003 | Palsson et al. | 435/288.7 |
| 6,556,153 | B1 | * | 4/2003 | Cardamone | 341/111 |
| 6,744,037 | B2 | * | 6/2004 | Yoshikawa et al. | 250/234 |
| 6,753,161 | B2 | * | 6/2004 | Koller et al. | 435/40.5 |
| 6,804,385 | B2 | * | 10/2004 | Eisfeld et al. | 382/128 |
| 7,005,810 | B2 | * | 2/2006 | Ueda et al. | 318/114 |
| 7,026,832 | B2 | * | 4/2006 | Chaya et al. | 324/754.1 |
| 7,092,557 | B2 | * | 8/2006 | Eisfeld et al. | 382/128 |
| 7,224,175 | B2 | * | 5/2007 | Chaya et al. | 324/754.1 |
| 7,251,575 | B2 | * | 7/2007 | Hiller | 702/94 |
| 7,300,795 | B2 | * | 11/2007 | Koller et al. | 435/460 |
| 7,505,618 | B2 | * | 3/2009 | Palsson et al. | 382/133 |
| 7,671,975 | B2 | * | 3/2010 | Mangan et al. | 356/39 |
| 7,865,324 | B2 | * | 1/2011 | Lindberg et al. | 702/94 |
| 2001/0005586 | A1 | * | 6/2001 | Palsson et al. | 435/40.5 |
| 2002/0076744 | A1 | * | 6/2002 | Koller et al. | 435/40.5 |
| 2002/0177885 | A1 | * | 11/2002 | Eisfeld et al. | 607/89 |
| 2004/0081349 | A1 | * | 4/2004 | Chaya et al. | 382/145 |
| 2005/0047640 | A1 | * | 3/2005 | Eisfeld et al. | 382/133 |
| 2005/0133705 | A1 | * | 6/2005 | Hare et al. | 250/231.13 |
| 2005/0258986 | A1 | * | 11/2005 | Hare et al. | 341/50 |
| 2005/0276595 | A1 | | 12/2005 | Watkins et al. | |
| 2006/0139628 | A1 | * | 6/2006 | Chaya et al. | 356/237.1 |
| 2006/0251314 | A1 | * | 11/2006 | Eisfeld et al. | 382/133 |
| 2008/0014605 | A1 | * | 1/2008 | Palsson et al. | 435/29 |
| 2008/0050794 | A1 | * | 2/2008 | Koller et al. | 435/173.1 |
| 2009/0191619 | A1 | * | 7/2009 | Eisfeld et al. | 435/288.7 |

* cited by examiner

*Primary Examiner* — Charles Kasenge
(74) *Attorney, Agent, or Firm* — BainwoodHuang

(57) ABSTRACT

A position encoder provides one or more trigger outputs based on position signals developed within the encoder, in addition to traditional position output signals used by other system components such as a motion controller. The trigger outputs may be used directly by a triggered device, bypassing the motion controller and obviating any separate trigger generation electronics. The trigger output(s) can be fully synchronous with the encoder's position output signal(s) with essentially no latency or jitter, increasing accuracy and providing improved system performance. The trigger functionality can be incorporated in a variety of encoder types (e.g., absolute and incremental) and technologies (optical, magnetic, inductive etc.), and used in conjunction with different position output signal formats (e.g., quadrature, serial).

20 Claims, 4 Drawing Sheets

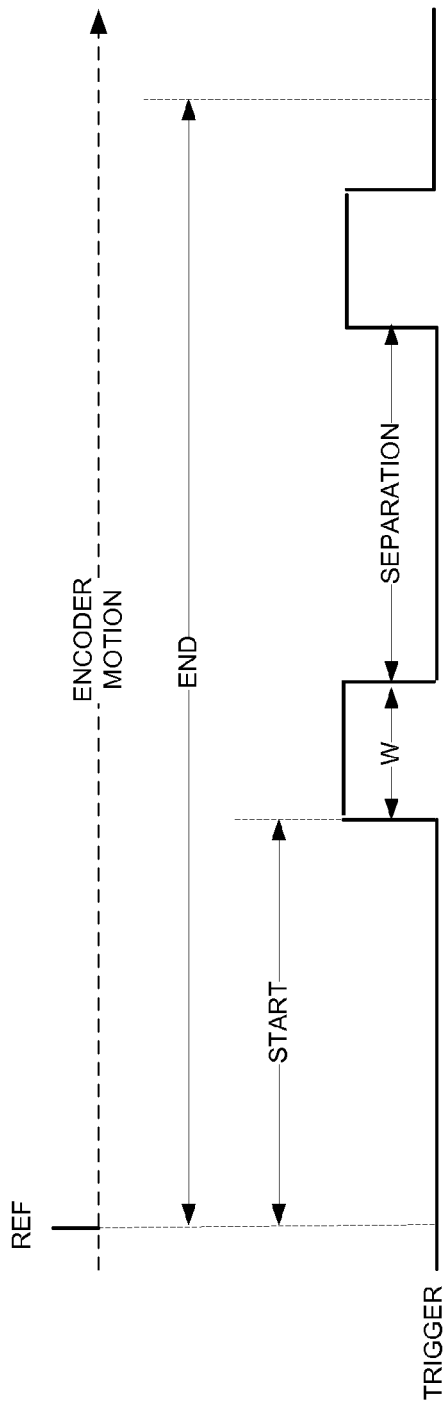
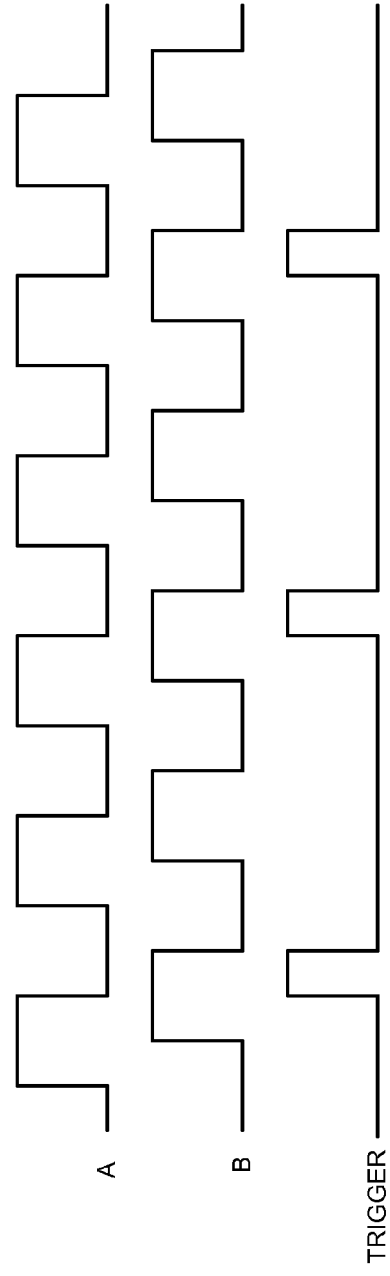

POSITION ENCODER WITH PROGRAMMABLE TRIGGER OUTPUT SIGNAL

BACKGROUND

The present invention is related to the field of position encoders and their use in motion control applications.

There are many motion control applications in which an event is triggered once or multiple times at pre-determined precise positional states of a system. These events may include the activation of a device such as a laser, camera, radar, sonar, x-ray, etc. The motion of a stage relative to the device is controlled by a controller, and a position encoder is used to detect relative position and provide position feedback information to the controller. These systems may employ trigger generation electronics to create a digital signal that triggers the event(s) when the stage has particular position(s). The trigger generation electronics operate in response to signals from the controller, which in turn are generated based on the position feedback information from the encoder. The trigger generation electronics may be packaged separately from the controller, or in some cases together with the controller.

With the current technology, the controller deciphers position data from the encoder and outputs corresponding position data to the trigger generation electronics, which uses the position data to generate trigger(s) at desired position(s). There can be significant delay (or latency) between the detection of a position by the encoder and the generating of a trigger signal by the trigger generation electronics. This delay can contribute to inaccuracy in operation, because the stage continues to move during the response time of the controller and trigger generation electronics and thus the resulting event (e.g., firing of a laser) does not occur precisely at the desired position. Additionally, trigger outputs may not be accurately spaced due to "jitter" (variability in the response time relative to motion speed), so that the resulting events are irregularly spaced.

SUMMARY

It is desired to achieve greater accuracy in motion control applications which employ events generated at specific relative positions.

To address this goal, a position encoder is disclosed which can provide one or more trigger output signals based on position signals developed within the encoder. The trigger output signals are separate from the position output signals provided to a controller that controls motion in the system. The trigger output signals may be used directly by a triggered device, bypassing the controller and obviating any trigger generation electronics. The trigger output signals can be fully synchronous with the encoder's position output signal with essentially no latency or jitter, increasing accuracy and providing improved system performance. In addition, cost savings can be realized because separate trigger generation electronics are not be needed.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIGS. 4 and 5 are examples of trigger signals generated by a position encoder.

DETAILED DESCRIPTION

Figure 1:
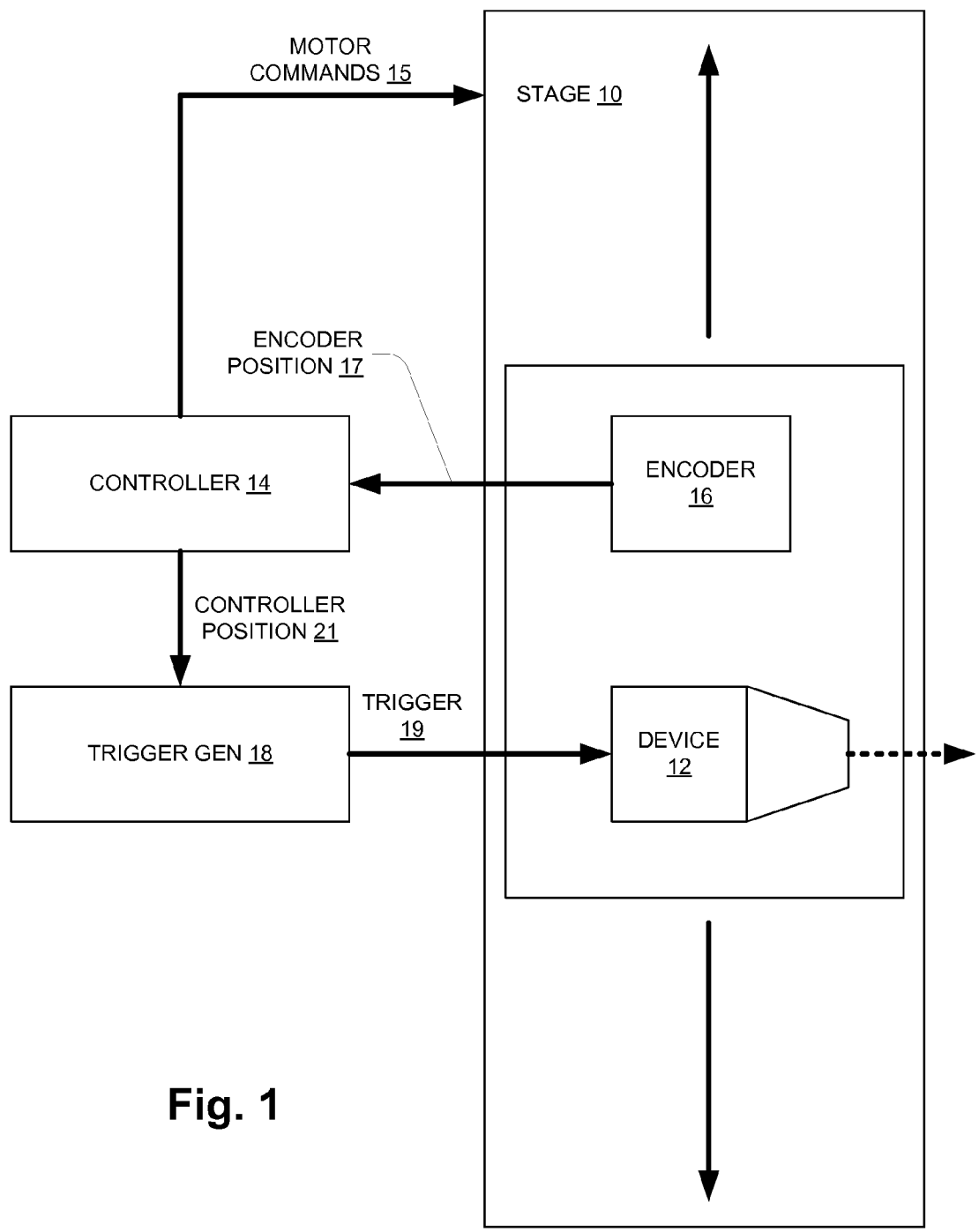
FIGS. 1 and 2 are block diagrams of systems employing motion control.

FIG. 1 shows an example system employing motion control of a stage 10 along with position-based triggering of a device 12. The motion of the motor-driven stage 10 relative to the device 12 is controlled by a controller 14 generating motor command signals 15, and a position encoder 16 is used to detect relative position and provide position feedback information in the form of encoder position signals 17 to the controller 14 for use in the motion control function. Trigger generation electronics 18 creates a binary trigger signal 19 that triggers the event(s) when the stage 10 is at particular position(s). The trigger generation electronics 18 operates in response to controller position signals 21 from the controller 14, which in turn are generated based on the encoder position signals 17 from the encoder 16.

The device 12 may include a source of pulsed energy and the triggered event is the generating of a pulse of energy from the device 12. Examples of such pulsed sources include a laser, a radar or sonar, and an x-ray generator. The device 12 may also include, either alternatively or in addition to a source, a receiver of input energy and the triggered event is receiving a predetermined unit of input energy. Examples of such receivers include a camera and a radar/sonar receiver. In the case of a camera, the event can be operating a shutter of the camera to capture an image.

As generally known in the art, there are two widely used types of encoder position output signals. One type is referred to as "quadrature" output or, more colloquially "A quad B", and the other is a serial output. These are briefly described to provide context for the remainder of the present description.

Quadrature output typically employs two binary signal channels (A and B) whose outputs are nominally offset by ¼ of a cycle, with a state transition occurring alternately on the channels whenever the encoder 16 moves over a certain position increment. An example is provided below. The controller 14 employs a counter to track position of the stage. The counter may be reset when the stage 10 is brought to a reference position, and then it is incremented and decremented in response to the state transitions of the A and B signals, thereby tracking incremental position changes and maintaining a representation of the absolute position in the form of the count value. The direction of the stage 10 is determined by monitoring the relative phasing of the A and B channels while the stage 10 is in motion.

A serial output encoder generates a serial output word which represents the current position. Typically the serial output word is generated in response to a request input signal from a separate controller, e.g. controller 16, which the controller asserts to the encoder when the controller needs to know the position of the stage 10.

For either type of encoder, in the configuration of FIG. 1 the controller 14 converts the encoder position signals 17 (whether quadrature or serial) into the controller position signals 21 which are provided to the trigger generation electronics 18. In many cases the position information in the controller position signals 21 has a different resolution than the resolution conveyed by the encoder position signal 17.

The trigger generation electronics 18 compares the position information in the controller position signals 21 to predetermined position values which correspond to trigger points for the device 12, which may be either programmed or hardwired position values. When the position information matches a given predetermined position value, the corresponding trigger signal is asserted. As noted above, due to the delay through the controller 16 and trigger generation electronics 18, motion of the stage 10 can cause an offset and jitter between the trigger signal 19 and the actual stage position, resulting in inaccurate system operation.

Figure 2:
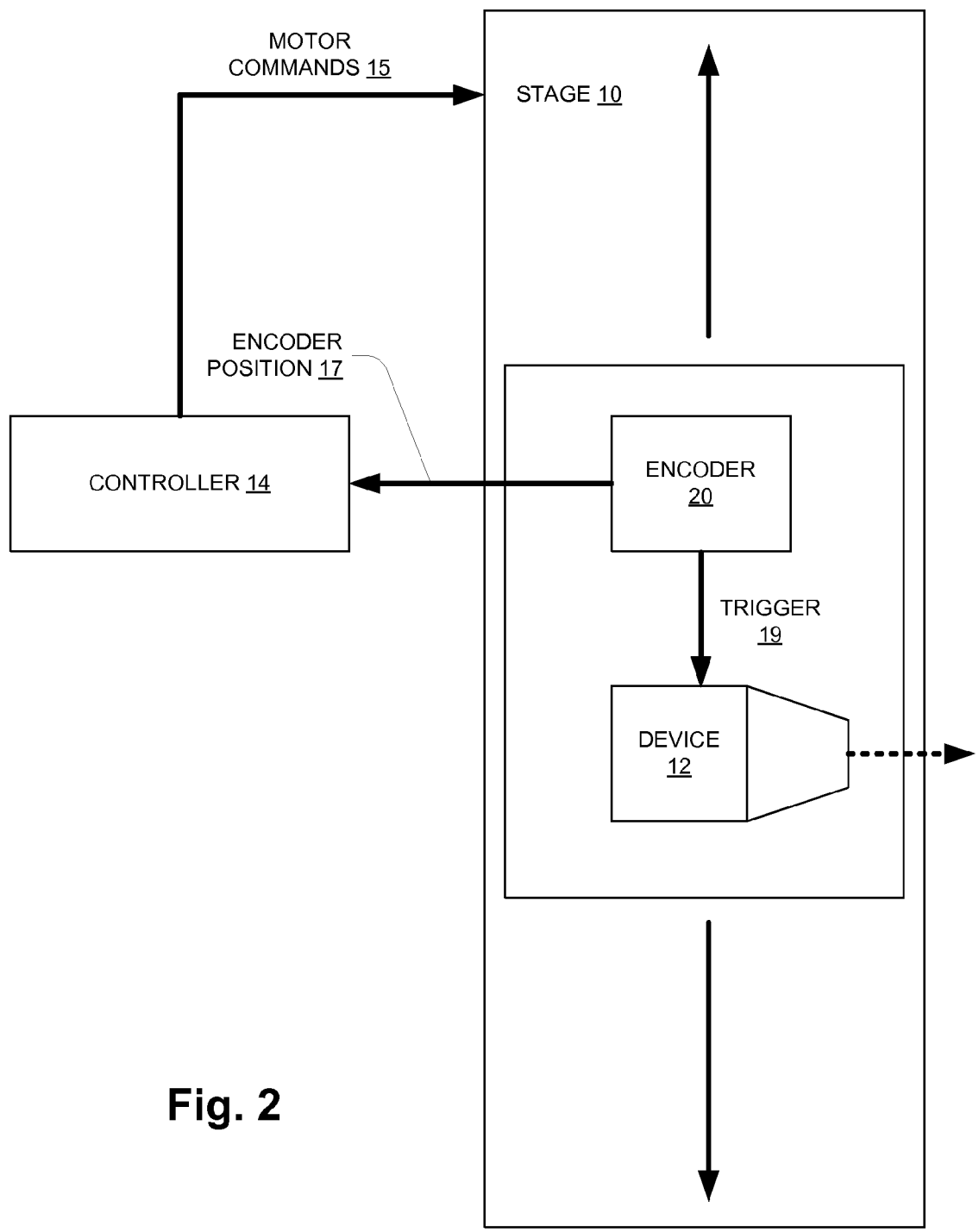

FIG. 2 shows an example system also employing motion control along with position-based triggering of a device, but exhibiting less offset and jitter between the triggering of the device and the desired trigger position than in the configuration of FIG. 1. The motion of the motor-driven stage 10 relative to the device 12 is again controlled by a controller 14 generating motor command signals 15 based on position feedback information in encoder position signals 17 from an encoder 20. The encoder 20 also creates the trigger signal 19 which is provided to the device 12 to trigger the desired event(s) when the stage 10 is at particular position(s). The trigger signal 19 passes directly from the encoder 20 to the device 12, bypassing the controller 14 and any separate trigger generating electronics and their attendant delay and jitter.

An encoder system generally includes a read head, a scale which is affixed to an element that moves relative to the read head, and electronics to provide a user interface. In the systems of FIGS. 1 and 2, for example, the scale may be affixed to the stage 10 while the item labeled "encoder" (16 or 20) represents the read head which has a fixed position relative to the device 12. There are many types of encoder position sensing technologies including optical, magnetic, and inductive. There are absolute encoders, which have a unique pattern at every location on the scale, and incremental encoders, which have repeating patterns and typically a reference point pattern to be used as a home position at power up.

Figure 3:
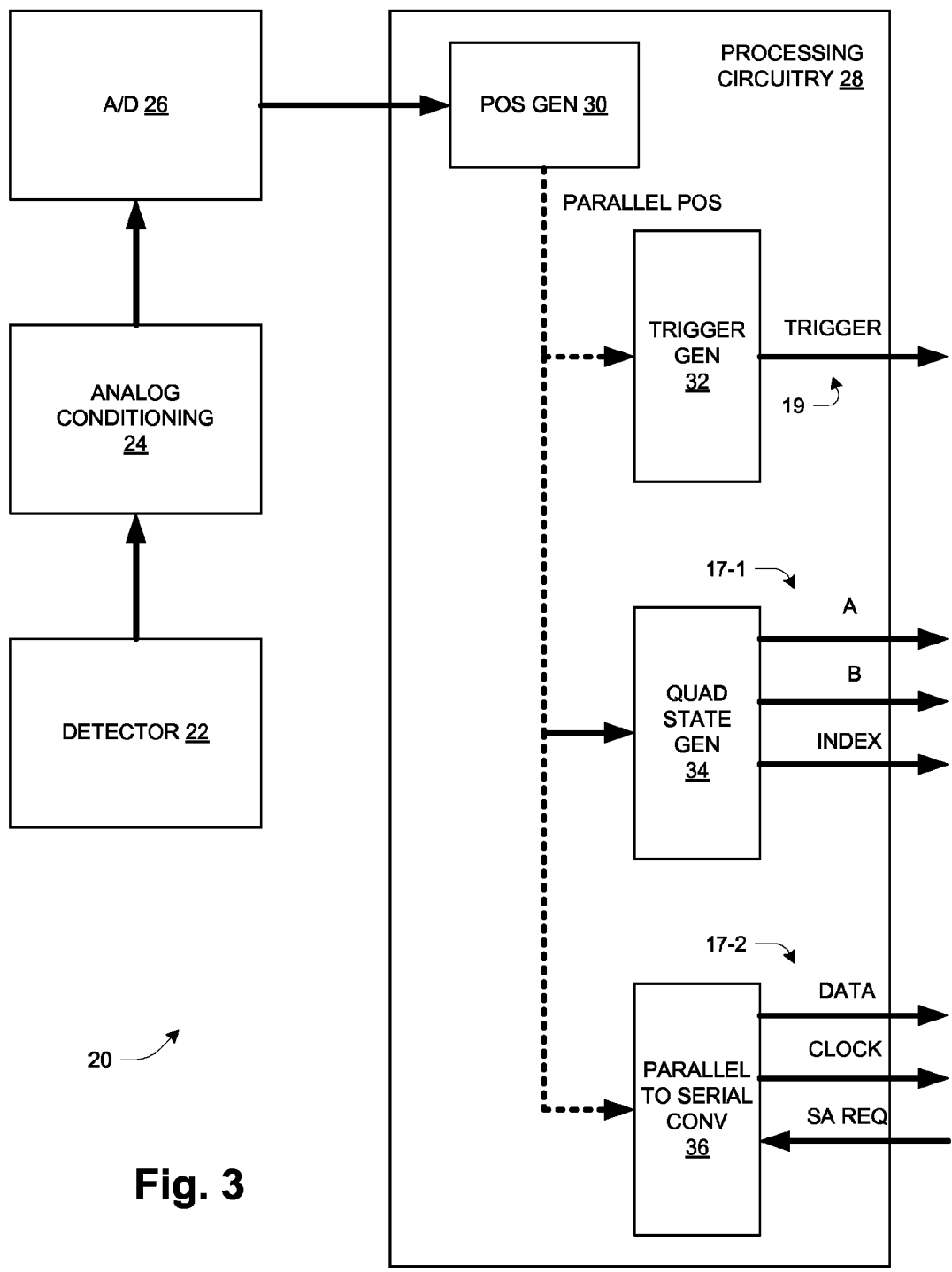
FIG. 3 is a block diagram of a position encoder.

FIG. 3 shows a block diagram of a detector (or sensor) and electronics of the encoder 20. The detector 22 is a transducer that generates electrical output position signals in response to patterns of energy it detects. For example, the detector 22 may be a photo-detector, magnetic detector, inductive detector, etc. which is in close proximity to a scale which is capable of modulating the light or magnetic field provided to the detector 22 according to changes in the position of the scale as it moves relative to the detector 22. The signals from the detector 22 are conditioned with analog conditioning electronics 24 and then converted to digital signals by analog-to-digital conversion circuitry (A/D) 26. Digital processing circuitry 28 converts the digitized detector signals from the A/D 26 to position signals and provides a digital interface for the user. The processing circuitry 28 may be embodied in any of several forms, for example as a field-programmable gate array (FPGA) or a digital signal processor (DSP).

In FIG. 3, the processing circuitry 28 is shown as including a position generator 30, a trigger generator 32, a quadrature state generator 34 and a parallel to serial converter 36. In the case of using an FPGA or DSP, these components may advantageously be realized as modules or sections of firmware code. In alternative embodiments one or more of these components may be realized by hardware logic that does not employ instruction-set processing.

The position generator 30 may contain a number of subsections such as raw signal correction, signal conditioning features, home (also called an index or reference point) calculation, and position interpolation. The output of the position generator 30 is a generic parallel position word PARAL-LEL POS that is available to other independent firmware code sections within the FPGA or DSP, such as the components 32-36 as shown. The position information in the parallel position word is passed to other system elements as one or more encoder outputs. FIG. 3 shows three options for output types. One or more trigger signals 19 are generated by the trigger generator 32. Quadrature output signals A, B and INDEX (reference position) (collectively identified by ref 17-1) are generated by the quadrature generator 34. Serial output signals DATA and CLOCK (collectively 17-2) are generated by the parallel to serial converter 36. The three components 32-36 all use the same parallel position word from the position generator 30 as an input, and each converts the position information to a respective user-friendly output. The quadrature output signals 17-1 and serial output signals 17-2 basically convey the same information, so in most applications only one or the other, but not both, will be used. The trigger signal(s) 19 can be used advantageously in conjunction with either the quadrature or serial outputs.

With an incremental encoder, the parallel position word represents the position relative to where the encoder powered up or relative to an index or reference location on the scale. With an absolute encoder, the parallel position word represents the absolute position of the encoder on the scale without any requirement for initially passing through an index location, because the scale has a unique pattern at every location. The format of the parallel position word may be the same in each case. In addition, the format of the parallel position word may be same regardless of the particular position sensing technology (optical, magnetic, or inductive), and also regardless of the exact configuration of the analog conditioning electronics 24 and A/D circuitry 26. For this reason, the trigger output may be a feature of virtually any type of encoder.

Additionally, although the trigger signal 19 can be implemented with discrete electronics in the encoder, this may add cost and complexity and may limit the trigger output to fixed predetermined positions rather than programmable positions. When an FPGA or DSP is used, the trigger output functionality may be added to the encoder with no extra associated cost and can be fully programmable, which can be advantageous or even required for certain applications.

FIG. 4 provides an illustration of a pattern of a programmable trigger signal. A pattern of this type may be achieved by a user loading trigger settings into the encoder 20 through a set-up process using a built-in communication port, such as a USB port, Ethernet port, etc., or using a separate set-up tool. As illustrated, typical settings may include the following, all of which are measured in encoder counts such as described above:

Distance START from reference point to start the trigger output

Width W of the trigger pulse

Distance SEPARATION between trigger pulses

Distance END from reference point to end the trigger output

Once the settings are loaded, the trigger pattern occurs automatically as the stage 10 moves relative to the encoder 16. The reference point (shown as REF) may refer to the index position of an incremental encoder or some predetermined point on the scale for an absolute encoder.

The basic example illustrated in FIG. 4 may cover a large variety of applications. However, the trigger pattern can be as exotic as may be needed in a particular application. For example, the width W and the SEPARATION could be replaced by a look up table that can define much more complex trigger patterns.

FIG. 5 shows an example of the relationship between quadrature output signals A, B and a trigger signal TRIGGER generated by the encoder 20 of FIG. 3. Because the trigger generator 32 is built into the encoder 20, the trigger pattern is fully synchronous with the quadrature state transitions and exhibits substantially no delay or jitter between the encoder position output and the trigger output. In the case of a serial output, the controller 14 must request a position sample and obtain it from the encoder, which as described above can be problematic for generating accurate triggers. With the trigger generator 32 built into the encoder 20, the trigger signal may be output independent of the serial signals. In other words, the trigger signals occurs at the correct positions without any need for the controller 14 to first obtain the position information via the serial signals.

While various embodiments of the invention have been particularly shown and described, it will be understood by those skilled in the art that various changes in form and details may be made therein without departing from the spirit and scope of the invention as defined by the appended claims.

What is claimed is:

1. A position encoder, comprising:
   a detector operative to generate a detector output signal in response to an energy pattern modulated according to a relative position being measured by the position encoder;
   conditioning and conversion circuitry operative to generate a digital position signal in response to the detector output signal; and
   processing circuitry including (1) a position word generator operative to generate a digital position word from the digital position signal, (2) an output position signal generator operative in response to the digital position word to generate position output signals conveying position information contained in the digital position word, and (3) a trigger output generator operative in response to the digital position word to generate one or more trigger output signals when the digital position word has corresponding predetermined values.

2. A position encoder according to claim 1, wherein the processing circuitry is configured to permit external programming of the predetermined values.

3. A position encoder according to claim 2, wherein the predetermined values correspond to a trigger start time, a trigger end time, a trigger width and a trigger separation.

4. A position encoder according to claim 3, wherein the predetermined values are specified by corresponding values of counts of position increments of the position encoder.

5. A position encoder according to claim 2, wherein the predetermined values are table entries each specifying a particular transition of a trigger output signal at a particular position.

6. A position encoder according to claim 1, wherein the position encoder is an incremental encoder and the digital position word is generated as a count of position increments of the position encoder after the position encoder has passed through a reference position to set an initial value of the count.

7. A position encoder according to claim 1, wherein the position encoder is an absolute encoder and the digital position word is generated directly from position markings that are unique across an entire range of the relative position being measured by the position encoder.

8. A position encoder according to claim 1, wherein the position output signals are quadrature signals conveying incremental position as phased transitions.

9. A position encoder according to claim 1, wherein the position output signals are serial output signals conveying position as a digital value in response to a request received by the position encoder from an external controller.

10. A position encoder according to claim 1, wherein the processing circuitry includes instruction-based circuitry, and the output position signal generator and trigger output generator include respective firmware code executed by the instruction-based circuitry to generate the position output signals and the trigger output signals respectively.

11. A position encoder according to claim 10, wherein the instruction-based circuitry is selected from a field programmable gate array and a digital signal processor.

12. A system, comprising:
    a device having an operation to be triggered by a trigger signal;
    a stage configured for motion relative to the device under control of motion control signals, the stage passing through a predetermined relative position at which the operation is to be performed;
    a position encoder operative to generate a position output signal representing relative position between the stage and the device, the position output signal being generated from a digital position word developed within the position encoder from an output of a transducer converting a modulated energy pattern into a corresponding electrical position signal; and
    a controller operative in response to the position output signal to generate the motion control signals to effect a desired motion of the stage relative to the device,
    wherein the position encoder includes a trigger output generator operative to generate the trigger signal in response to the digital position word, the trigger signal being asserted when the digital position word has a predetermined value representing the predetermined relative position.

13. A system according to claim 12, wherein the device includes a source of pulsed energy and the operation is generating a pulse of energy.

14. A system according to claim 13, wherein the source of pulsed energy is selected from a laser, a sonar and an x-ray generator.

15. A system according to claim 12, wherein the device includes a receiver of input energy and the operation is receiving a predetermined unit of input energy.

16. A system according to claim 15, wherein the receiver includes a camera and the operation includes operating a shutter of the camera to capture an image.

17. A system according to claim 12, wherein the trigger output generator is configured to permit external programming of the predetermined value.

18. A system according to claim 12, wherein the position output signal of the position encoder is selected from quadrature signals and a serial output signal, the quadrature signals conveying incremental position as phased signal transitions, and the serial output signal conveying position as a digital value in response to a request received by the position encoder from the controller.

19. A system according to claim 12, wherein the position encoder includes instruction-based processing circuitry, and the trigger output generator includes firmware code executed by the instruction-based processing circuitry to generate the trigger signal.

20. A system according to claim 19, wherein the instruction-based processing circuitry is selected from a field programmable gate array and a digital signal processor.

* * * * *